United States Patent [19]
Swanson

[11] 3,856,361
[45] Dec. 24, 1974

[54] VEHICLE BRAKING SYSTEM
[75] Inventor: Allan R. Swanson, St. Joseph, Mich.
[73] Assignee: Clark Equipment Company, Buchanan, Mich.
[22] Filed: Jan. 5, 1973
[21] Appl. No.: 321,422

[52] U.S. Cl.............. 303/6 R, 188/151 A, 303/84 A
[51] Int. Cl.............................................. B60t 11/32
[58] Field of Search............ 303/6, 84, 9, 2, 13, 10, 303/61, 68; 188/152, 151 A, 151 R

[56] References Cited
UNITED STATES PATENTS

| | | | |
|---|---|---|---|
| 2,265,117 | 12/1941 | Seymour............................ | 303/84 A |
| 2,729,226 | 1/1956 | Jones................................. | 303/84 A |
| 3,456,988 | 7/1969 | Gibbons et al...................... | 303/2 |
| 3,503,655 | 3/1970 | Heimler............................. | 303/84 A |
| 3,504,946 | 4/1970 | Valentine et al. .................. | 303/13 |
| 3,504,948 | 4/1970 | Inada................................. | 303/6 R |

*Primary Examiner*—Trygve M. Blix
*Assistant Examiner*—D. C. Butler
*Attorney, Agent, or Firm*—McGlynn and Milton

[57] ABSTRACT

A vehicle braking system including a first braking system for the front wheels of a vehicle and a second braking system for the rear wheels of a vehicle. Fluid is applied to the braking systems by a primary fluid supply including a treadle valve which is normally manually operated to apply the brakes and through first and second two-way check valves, one for the first braking system for the front wheels and one for the second braking system for the rear wheels. An auxiliary fluid supply is included for supplying auxiliary fluid pressure to the first and second twoway check valves and hence to the first and second braking systems when there is a malfunction or a leak in the primary fluid supply system. Included in the auxiliary fluid supply is an auxiliary source of fluid pressure which passes through a fluid flow regulator and through a flow control device comprising a check valve and then to the first and second two-way check valves associated with the first and second brake systems. The check valve comprising the flow control device has a fluid inlet from the regulator and an outlet to the first two-way check valve and an outlet to the second two-way check valve. A valve member is disclosed in an intermediate position between the two outlets for dividing the flow from the regulator and there is included a valve seat associated with each outlet and the valve member is responsive to increased flow to either outlet above the flow rate to the other outlet for seating the valve member with the seat at the outlet having the increased flow to terminate the flow through that outlet. Thus, when the auxiliary system is in use and there is a leak in one or the other of the first or second braking systems fluid flow from the auxiliary fluid supply is terminated to that braking system having the leak.

8 Claims, 3 Drawing Figures

VEHICLE BRAKING SYSTEM

This invention relates to a vehicle braking system and more specifically to a fluid pressure actuated system for operating the brakes of a motor or other type of vehicle.

Braking systems of the type to which the instant invention pertains typically include at least two sets of braking means such as the pair of braking assemblies for the rear wheels of the vehicle and the pair of braking assemblies for the front wheels of the vehicle. Normally there is a primary source of fluid pressure either hydraulic or air which may be supplied to the two braking means for applying the brakes of a vehicle. This primary fluid pressure is selectively applied by an operator by actuation of some sort of control valve.

In addition, such systems also typically include an auxiliary source of fluid pressure for supplying auxiliary pressure to the braking means in substitution for the primary fluid supply means so that the brakes may be applied in the event of a malfunction in the primary source of fluid pressure, such as by a leak in the primary system.

An example of such a system is that shown in U.S. Pat. No. 2,041,884 wherein fluid from a primary source passes through a manually actuated valve to a two-way check valve and then to the first and second braking means for two separate pairs of wheels respectively. Also included is an auxiliary source of fluid pressure which passes through a second valve and then to the two-way check valve to be distributed to the first and second braking means.

There are various other types of braking systems; however the subject invention is an improvement over the system described above and shown in U.S. Pat. No. 2,041,884. Although the system described above is very satisfactory, the subject invention provides an auxiliary fluid supply means which includes a flow control means for isolating either of the braking means from the supply of auxiliary fluid pressure independently of the supply of the auxiliary fluid pressure to the other braking means in response to a release of fluid pressure by the first mentioned braking means. In other words, in accordance with the instant invention if there is a leak in either of the braking means, which may be in addition to or independent of a leak in the primary fluid supply means, that braking means will not be supplied auxiliary fluid yet the other braking means will be supplied auxiliary fluid under pressure from the auxiliary fluid supply means.

Accordingly, it is an object and feature of this invention to provide such a vehicle braking system which includes first braking means responsive to fluid pressure for applying a first braking force, second braking means responsive to fluid pressure for applying a second braking force, primary fluid supply means for supplying primary fluid pressure to the braking means to actuate the braking means, and auxiliary fluid supply means for supplying auxiliary fluid pressure to the braking means in substitution for the primary fluid supply means with the auxiliary fluid supply means including flow control means for isolating one of the braking means from the supply of auxiliary fluid pressure independently of the supply of auxiliary fluid pressure to the other braking means in response to the release of fluid pressure by the first mentioned braking means.

Other objects and attendant advantages of the present invention will be readily appreciated as the same becomes better understood by reference to the following detailed description when considered in connection with the accompanying drawings wherein.

Figure 1:
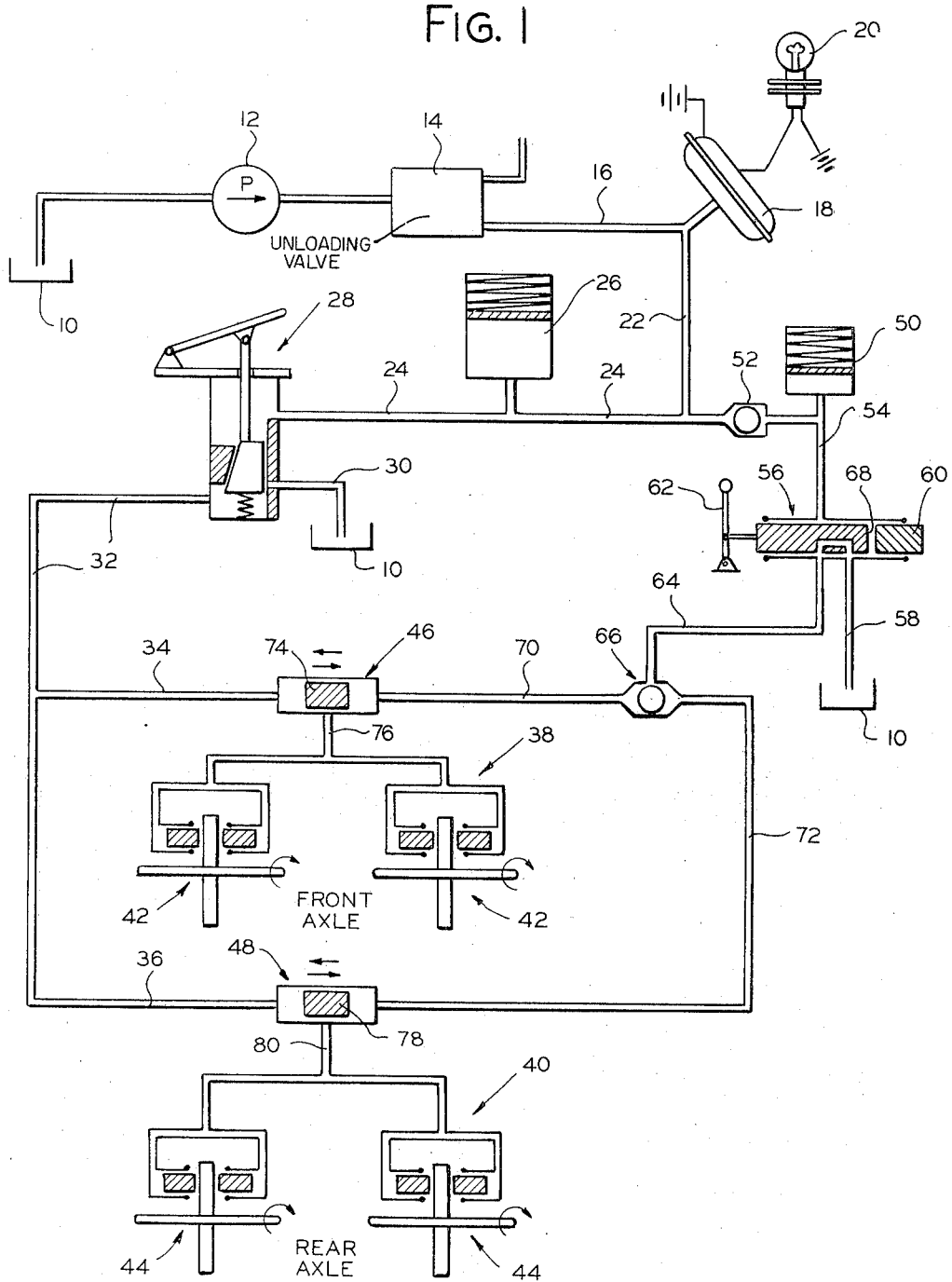
FIG. 1 is a schematic view of a preferred embodiment of the vehicle braking system of the instant invention.

The system includes a fluid reservoir 10, three positions of fluid communication therewith being indicated schematically in FIG. 1. A pump 12 supplies fluid pressure from the reservoir 10 to an unloading valve 14. The pump 12 may supply fluid pressure to other systems on a vehicle but the unloading valve 14 is adapted to prefer pressurization of the braking system and also prevents reverse flow from the braking system back to the pump 12 when the pump 12 is not in operation.

A fluid passage 16 leads from the unloading valve 14 to a pressure responsive electrical switch 18. The switch 18 illuminates a light 20 when subjected to a pressure below a predetermined value. Fluid passage or line 22 leads to a fluid passage or line 24 which is in communication with a service accumulator 26. The service accumulator 26 stores sufficient pressurized fluid to provide several applications of the brakes when the pump 12 is inoperative. Passage 24 leads on to a treadle valve generally indicated at 28. The treadle valve 28 is manually operated by the operator of a vehicle for applying the brakes and is vented by the fluid passage 30 to the reservoir 10. A fluid passage 32 leads from the treadle valve 28 to fluid passages 34 and 36.

The components thus far described comprise a primary fluid supply means for supplying primary fluid pressure to braking means to actuate the braking means.

The system also includes a first braking means generally shown at 38 and a second braking means generally shown at 40. The first braking means 38 includes a pair of braking assemblies 42 each of which is responsive to fluid pressure for applying a first braking force. In a like manner the second braking means 40 is responsive to fluid pressure for applying a second braking force to a second pair of braking assemblies 44. The braking assemblies 42 and 44 being of the type commonly used in vehicles as for example drum or disc brakes used on motor vehicles.

The system also includes a first valve means comprising a two-way check valve generally indicated at 46 and a second valve means comprising the two-way check valve generally indicated at 48.

The remaining components of the system illustrated in FIG. 1 comprise an auxiliary fluid supply means for supplying auxiliary fluid pressure to the braking means 38 and 40 in substitution for the primary fluid supply means.

More specifically the auxiliary fluid supply means includes an auxiliary accumulator 50 which is supplied fluid through the one-way check valve 52 from the passage 22 which is part of the primary fluid supply means. A passage 54 leads from the auxiliary accumulator 50 to a flow regulator generally indicated at 56. A fluid passage 58 establishes fluid communication between the flow regulator 56 and the reservoir 10. The flow regulator 56 includes a valve member 60 which is operatively attached to a manually actuated handle 62. As illustrated, a fluid passage 64 leads from the flow regulator 56 to a flow control means defined by the check valve generally indicated at 66. When the handle 62 is actuated to move the valve member 62 to the left, a fluid passage 68 in the valve member 60 establishes fluid communication between the fluid passage 54 and the fluid passage 64 so that auxiliary fluid pressure passes from the accumulator 50 to the valve 66. A fluid passage 70 leads from the valve 66 to the two-way check valve 46 and a fluid passage 72 leads from the valve 66 to the two-way check valve 48.

Two-way check valve 46 includes a valve member 74 which when subjected to fluid pressure from the passage 34 will move to the right to allow that fluid pressure to flow through the fluid passage 76 to the braking means 38. When no primary fluid pressure is supplied and auxiliary fluid pressure is supplied to the two-way check valve 46 through the fluid passage 70, the valve member 74 moves to the left to allow the auxiliary fluid pressure to pass through the fluid passage 76 to the braking means 38. Similarly the two-way check valve 48 includes a valve member 78 which controls fluid flow to the fluid passage 80 from either the fluid passage 36 of the primary fluid supply means or the fluid passage 72 of the auxiliary fluid supply means.

Figure 3:
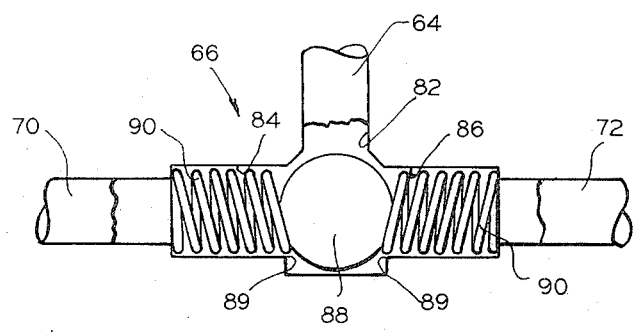
FIG. 3 is a schematic view of a valve which may be utilized in the auxiliary fluid supply means of the vehicle braking system of the instant invention.

FIG. 3 is an enlarged schematic view of the valve 66. The check valve 66 has an inlet 82 from the fluid flow regulator 56 through the fluid passage 64. There are also the outlets 84 and 86 to the respective fluid passages 70 and 72. A valve member defined by a ball 88 is disposed in an intermediate position between the outlets 84 and 86 for dividing the flow to the outlets from the inlet 82. Shoulders 89 spaced from the ball 88 when in the intermediate position define valve seats at each outlet for preventing the flow therethrough when the ball is seated on either outlet at either seat. Springs 90 define spring means biasing the ball 88 to the intermediate position. In accordance with the Bernoulli theory if there is a leak in the first brake means 38 the fluid pressure will drop in the line 70 thereby creating a demand such that the flow will increase past the left-hand upper portion of the ball 88. As this flow increases the ball 88 will be moved to the left to the seat of the outlet 84 preventing further fluid flow through the outlet 84 and through the line 70. Consequently all of the fluid pressure from the auxiliary fluid means passes to the fluid passage 72. Conversely if there were a drop in fluid pressure of the braking means 48, the fluid pressure would drop in line 72 and the ball 88 would be drawn to the right and into a seating position to block the outlet 86 whereby all of the fluid pressure supplied from the fluid passage 64 would move through the fluid passage 70. An example of a valve which may be used for control valve 66 forms the subject of U.S. Pat. No. 2,322,658.

Thus, the two-way valve 46 defines a first valve means responsive to fluid pressure from both the primary and auxiliary fluid supply means for supplying said first braking means 38 fluid pressure from one of the primary and auxiliary supply means. Similarly the two-way valve 48 defines a second valve means responsive to fluid pressure from both the primary and auxiliary fluid supply means for supplying the second braking means 40 fluid pressure from one of the primary or auxiliary fluid supply means. The valve 66 defines a flow control means and the fluid passage 70 is a first fluid passage interconnecting the valve 66 and the first valve means 46. Similarly the fluid passage 72 defines a second fluid passage interconnecting the valve 66 and the second valve means 48. Thus, the valve 66 defining the flow control means is responsive to a predetermined drop in fluid pressure in either of the first or second fluid passages 70 and 72 respectively for discontinuing the supply of auxiliary fluid pressure thereto.

As set forth above the auxiliary fluid supply means includes a source of auxiliary fluid pressure from the accumulator 50 and a fluid flow regulator means 56 for controlling the flow of auxiliary fluid pressure from the source or accumulator 50 to the flow control means as defined by the valve 66. As described above the flow regulator 56 is manually actuatable by movement of the handle 62. Thus if the fluid pressure drops in the passages 24 and 32 the switch 18 will sense such a drop and illuminate the warning light 20. Upon illumination of the warning light 20 the operator may move the handle 62 so as to move the valve member 60 to the left whereupon auxiliary fluid pressure from the accumulator 50 will be supplied to the braking means 38 and 40. If there are no leaks in the brake means 38 and 40 both of the valve members 74 and 78 will move to the left because of the auxiliary fluid pressure being supplied thereto through the fluid passages 70 and 72 and allow auxiliary fluid pressure to be supplied to the braking means 38 and 40. If, however, there is a leak in either passage 70 and 72 or downstream of either of the valves 46 or 48, the flow control valve 66 will terminate fluid flow to the braking means associated with the leak.

Figure 2:
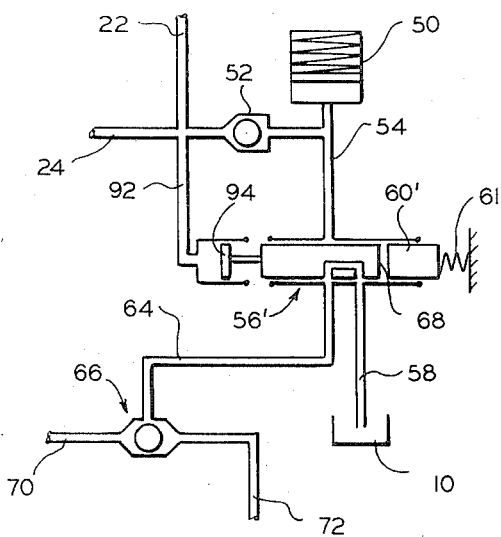
FIG. 2 is a partial schematic view showing alternative components in the auxiliary fluid supply means of the vehicle braking system of the instant invention.

Alternatively, and referring to FIG. 2, the flow regulator may be responsive to the primary fluid pressure. More specifically, FIG. 2 shows an alternative flow regulator 56'. The flow regulator 56' includes a valve member 60' which is biased to the left by a spring memeber 61. Normally fluid pressure from the primary source of fluid is conveyed through the fluid passage 92 and acts upon the piston 94 to maintain the valve member 60' in the right-handmost position as illustrated. However, upon a drop of pressure in the primary fluid supply means, the spring 61 will move the valve member 60' to the left automatically establishing fluid communication between the auxiliary accumulator 50 and the passage 64. Thus by employing the flow regulator of FIG. 2 auxiliary fluid pressure is supplied to the braking means 38 and 40 automatically upon a failure of the primary fluid supply means.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A vehicle braking system comprising: first braking means responsive to fluid pressure for applying a first braking force; second braking means responsive to fluid pressure for applying a second braking force; primary fluid supply means for supplying primary fluid pressure to said first and second braking means to actuate said first and second braking means; auxiliary fluid supply means for supplying auxiliary fluid pressure to said first and second braking means upon a release of fluid pressure in said primary fluid supply means, said auxiliary fluid supply means including flow control means for isolating one of said braking means from the supply of said auxiliary fluid pressure independently of the supply of said auxiliary fluid pressure to the other braking means in response to the release of fluid pressure by said one of said braking means, first valve means responsive to fluid pressure from both of said primary and said auxiliary fluid supply means for supplying said first braking means fluid pressure from one of said primary and said auxiliary fluid supply means, and second valve means responsive to fluid pressure from both of said primary and said auxiliary fluid supply means for supplying said second braking means fluid pressure from one of said primary and said auxiliary fluid supply means, said auxiliary fluid supply means including a first fluid passage interconnecting said flow control means and said first valve means and a second fluid passage interconnecting said flow control means and said second valve means, said flow control means being responsive to a predetermined drop in fluid pressure in either one of said passages for discontinuing the supply of auxiliary fluid pressure thereto.

2. A system set forth in claim 1 wherein said auxiliary fluid supply means further includes a source of auxiliary fluid pressure, and fluid flow regulator means for controlling the flow of auxiliary fluid pressure from said source of auxiliary fluid pressure to said flow control means.

3. A system as set forth in claim 2 wherein said fluid flow regulator is manually actuatable.

4. A system as set forth in claim 2 wherein said fluid flow regulator is responsive to said primary fluid pressure.

5. A system as set forth in claim 2 wherein said flow control means comprises a check valve having an inlet from said fluid flow regulator and an outlet to each of said first and second fluid passages, a valve member normally disposed in an intermediate position between said outlets for dividing flow thereto from said inlet, said valve member having a valve seat at each outlet for preventing flow therethrough when seated, said valve member being responsive to an increased flow rate to either outlet above the flow rate to the other outlet for seating with the seat at the outlet of increased flow to terminate all flow therethrough.

6. A system as set forth in claim 5 wherein said check valve includes spring means biasing said valve member to said intermediate position.

7. A system as set forth in claim 2 wherein said first valve means comprises a first two-way check valve having an inlet from said primary fluid supply means, an inlet from said auxiliary fluid supply means, an outlet to said first braking means and a valve member to alternately allow fluid flow from one of said inlets to said outlet; and said second valve means comprises a second two-way check valve having an inlet from said primary fluid supply means, an inlet from said auxiliary fluid supply means, an outlet to said second braking means and a valve member to alternately allow fluid flow from one of said inlets to said outlet thereof.

8. A system as set forth in claim 7 wherein said primary fluid supply means includes a source of primary fluid pressure, a manually actuatable valve controlling the flow of primary fluid pressure to said first and second valve means, a one-way check valve for allowing fluid flow from said primary fluid supply means to said auxiliary fluid supply means, a service accumulator for storing primary fluid pressure, and an auxiliary accumulator for storing auxiliary fluid pressure, said auxiliary accumulator being supplied through said one-way check valve.

* * * * *